US006668947B2

(12) United States Patent  
Cordova

(10) Patent No.: US 6,668,947 B2  
(45) Date of Patent: Dec. 30, 2003

(54) DRILL CUTTING TREATMENT METHOD

(76) Inventor: Ramon Perez Cordova, Circuito de la Industria Norte, #232 y 233, Co Parque Industrial Lerma, CP 52000, Lerma Edo (MX)

( * ) Notice: Subject to any disclaimer, the term of this patent is extended or adjusted under 35 U.S.C. 154(b) by 43 days.

(21) Appl. No.: 09/683,881

(22) Filed: Feb. 27, 2002

(65) Prior Publication Data

US 2003/0056987 A1 Mar. 27, 2003

(30) Foreign Application Priority Data

Sep. 25, 2001 (MX) .......................................... 01009672

(51) Int. Cl.$^7$ .............................................. E21B 21/06
(52) U.S. Cl. .............................. 175/66; 202/91; 203/34; 203/36; 588/228
(58) Field of Search ...................... 175/66, 207; 202/91; 34/343; 203/34–37; 588/228

(56) References Cited

U.S. PATENT DOCUMENTS

| 1,444,794 A | | 2/1923 | Kernan | |
| 4,460,551 A | * | 7/1984 | Boese et al. | 423/166 |
| 4,606,283 A | | 8/1986 | DesOrmeaux et al. | 110/250 |
| 4,841,998 A | | 6/1989 | Bruya | 134/10 |
| 4,913,586 A | | 4/1990 | Gabbita | 405/129 |
| 5,039,415 A | | 8/1991 | Smith | 210/611 |
| 5,228,804 A | | 7/1993 | Balch | 405/128 |
| 5,234,577 A | * | 8/1993 | Van Slyke | 208/13 |
| 5,272,833 A | | 12/1993 | Prill et al. | 47/1.42 |
| 5,414,207 A | | 5/1995 | Ritter | 588/266 |
| 5,430,237 A | * | 7/1995 | Sharp | 175/66 |
| 5,630,785 A | | 5/1997 | Pridemore et al. | 588/255 |
| 5,927,970 A | | 7/1999 | Pate et al. | 432/115 |
| 6,251,288 B1 | * | 6/2001 | Sicotte et al. | 175/66 |

* cited by examiner

Primary Examiner—Heather Shackelford  
Assistant Examiner—John Kreck  
(74) Attorney, Agent, or Firm—Daniel N. Lundeen; Lundeen & Dickinson, LLP

(57) ABSTRACT

A method and apparatus for treating for disposal oil-contaminated clay substrates such as drill cuttings from drilling with an oil-based mud. If necessary, the substrate is pretreated with an aqueous emulsion breaker such as alkylbenzenesulfonic acid. The substrate is mixed under high shear conditions with a mineral acid such as sulfuric acid. This can be done in an agitated reactor with sequential addition of the organic and inorganic acids. The substrate is then mixed with alkaline earth such as lime in a second agitated reactor. The reactions between the acid(s), alkaline earth and substrate are exothermic and provide heat to vaporize the oil, reaction products and water. Recoverable constituents in the vapor can be condensed in a vapor collection system. The treated substrate is essentially free of oil and has a controlled water content.

67 Claims, 6 Drawing Sheets

DRILL CUTTING TREATMENT METHOD

BACKGROUND OF INVENTION

This invention relates to the treatment of drill cuttings contaminated with oil for environmentally acceptable disposal, and more particularly to sequential treatment of the drill cuttings with an optional organic demulsifier, an acidification agent and alkaline earth for the purpose of rapidly removing the oil from the drill cuttings to obtain treated drill cuttings essentially free of oil.

Oil-based drill cuttings are generally regarded as controlled or hazardous waste. As such, the drill cuttings can be disposed of in two different ways: (1) decontamination treatment; or (2) hazardous waste controlled landfill. Hazardous waste is considered a threat to the environment due to the risk of surface and subsurface water pollution, as well as air pollution, interrupting the equilibrium of the ecosystem. The disposal of hazardous waste in controlled landfills is usually the last environmental option, since the problem is only transferred from one place to another and the ultimate solution is merely postponed for a later date.

There are several technologies available to treat hazardous wastes by different means. All of them have advantages and limitations depending upon the contaminant type and concentration, the matrix in which the contaminant is dispersed, and finally the locations at which the cuttings are generated and are to be disposed of, which can be the same or different. The handling and treatment costs, process time, contaminant locations such as ecologically protected areas, nearby water bodies, human residences, desert, etc. and finally the total treatment time, are all factors in selecting the best available technology.

Oil and gas exploration depend on drilling wells at different depths with different diameters throughout different geological strata with multiple lithological manifestations such as clay, rock, sand, empty underground salt mines, brine and water tables. Drilling requires a drilling fluid, also known as drilling mud, with various physical functions such as: (1) Cooling and lubrication of the drill bit; (2) Formation of a filter cake for temporarily "casing" the wellbore; (3) Carrying the drill cuttings from the bit to the surface; and (4) Preventing blowout of reservoir fluids. The solid pieces of material cut by the bit, as the drilling advances, are known as drill cuttings. The drilling mud is a fluid of physical-chemical compounds with specific rheological characteristics to cover all the needs of the well as the different geological layers, depths and extreme pressure of natural fluids are met. There are two principal types of mud: (1) Oil-based mud (also known as inverse emulsion mud); and (2) Water-based mud. Their formulations vary according to the technology of each supplier and the general characteristics of each well in each field. These formulations are generally expensive, which is the reason for recirculating them. Before recirculation, their formulation must be adjusted to replace compounds lost during the process. The composition of many drilling muds typically includes the following compounds: (1) Bentonite; (2) Barite; (3) Diesel or other oil; (4) Polymers; (5) Sodium and potassium chlorides; and (6) Water. Water-based mud does not use diesel or oil but does use the chlorides; the inverse emulsion uses more diesel than water. As used herein, the term "oil-based mud" also includes synthetic muds that are sometimes classified separately even though they contain appreciable amounts of hydrocarbons, usually refined hydrocarbons instead of diesel. Because they do not contain difficult-to-dispose-of oil, water-based mud is sometimes used instead of the oil-based drilling fluids, even though the oil-based muds can be cheaper to use and can have operating advantages.

It is important to remember that, in all cases, the mud is a stable physical emulsion, necessarily so in order to prevent separation of its components that have different densities and other physical-electrical characteristics. Mud can be sticky and elastic, like gum, without losing its fluid qualities. As the contaminated oil-based drill cuttings lose water, they become stickier.

The mud is injected through the center of the drill string to the bit and exits to the surface in the annulus between the drill string and the wellbore, fulfilling, in this manner, the cooling functions and lubrication of the bit, casing of the well and, finally, carrying the drill cuttings to the surface. At the surface, the mud is separated from the drill cuttings to be reused, and the drill cuttings are disposed of, usually in controlled landfills.

The separation of the mud and drill cuttings is not perfect since the cuttings retain part of the drilling mud in concentrations that vary between 25 and in excess of 50 weight percent. Thus, drill cuttings can be considered hazardous waste, depending on the residual components of the mud and their concentrations. Environmental concerns demand that the drill cuttings showing contaminant characteristics, because of hazardous compound concentrations such as diesel, chlorides, polymers, etc., be handled and processed carefully before disposal into the environment. The best known prior art technologies for the treatment of inverse emulsion contaminated drill cuttings are: (1) Incineration; (2) Stabilization and Encapsulation; (3) Thermal Desorption; (4) Chemical Oxidation; (5) Biochemical Degradation; and (6) Controlled Landfills. The criteria used most often for selecting the best technology are: (1) Environmental reliability (environmental risk); (2) Specific environmental requirements, by legislation as well as geographical location; (3) Limitations presented by each technology (reliability of the equipment and processes); (4) Costs; (5) Process speed vs. cuttings generation speed; (6) Available space for treatment; (7) Characteristics of the final disposal site; and (8) Logistics. Encapsulation is seldom used because of the high risks involved since there is no guarantee of 100% encapsulation nor is there a guarantee that encapsulation will last over a long period of time under any environment at the final disposal site. Examples of encapsulation are seen in U.S. Pat. No. 4,913,586 to Gabbita; and U.S. Pat. No. 5,630,785 to Pridemore et al.

Biochemical degradation, as in U.S. Pat. No. 5,039,415 to Smith, requires constant supervision and control during the entire process, and this option is very slow and might take several years for treatment in each case. Controlled landfill is less and less attractive since the problem is not solved, and only changes the place and time for ultimate resolution.

Examples of incineration processes include U.S. Pat. No. 1,444,794 to Kernan; and U.S. Pat. No. 4,606,283 to Des-Ormeaux et al. The main limitation for incineration lies in its operational costs, and the process control is also difficult since the tight stoichiometric operating ranges are hard to maintain when, in practice, contaminant concentrations are often variable. Moreover, the incineration process is energy intense because the entire matrix has to be heated to combustion temperatures, many constituents of which have high thermal coefficients. Furthermore, flexibility to set up incineration equipment in the field is low and the logistical costs are high.

Thermal desorption, as in U.S. Pat. Nos. 5,228,804 to Balch, 5,272,833 to Prill et al. and/or 5,927,970 to Pate et al., presents several limitations, including low thermal efficiency, poor process control, low flexibility, high investment cost, high operating cost, and low feasibility for in situ projects. The thermal efficiency of thermal desorption is even lower than incineration since the heating of the entire matrix has to be indirect, creating additional investment, maintenance and operational costs, with poor process control. The viscoelastic characteristics of the drill cuttings make processing difficult because of the tendency for the drill cuttings to stick to walls and other equipment surfaces, thus reducing the thermal transmission by effectively decreasing the inner diameter of the drum with less productivity and/or quality. Furthermore, thermal desorption requires additional treatment for the recovered gases, by condensation or other means of treatment, further increasing its cost.

Chemical oxidation is disclosed in U.S. Pat. No. 5,414,207 to Ritter, for example. In this approach, lime preconditioned with a hydrophobizing agent is blended with wet soil in an inert atmosphere and introduced to a decomposition vessel. Air is then introduced to the mixture to effect oxidation and/or hydrolysis of the oil contaminants. The main focus of this approach is to delay hydrolysis of the lime until well after the mixture is blended to favor oxidation/hydrolysis of the organic contaminants, and as a consequence the process is relatively slow and not continuous.

SUMMARY OF INVENTION

The present invention is the discovery of a chemical oxidation/desorption method and system for treating drill cuttings for environmental disposal. Where necessary, the process pretreats the drill cuttings with an emulsion breaker, followed by mixing with a mineral acid, and then mixes the acidified cuttings with alkaline earth, preferably under conditions of high shear. The process steps are strongly exothermic and generate gaseous products to quickly remove the oil from the drill cuttings, e.g. in a residence time of approximately 60–80 seconds. The present invention thus achieves very rapid and extensive oil removal, reliability, efficiency and low costs with minimal energy consumption.

In one embodiment, the present invention provides a method particularly well-suited for treating a substrate comprising oil-contaminated clay for disposal. The method includes admixing the substrate with a concentrated mineral acid under high shear conditions to obtain a pre-heated, acidified admixture having an aqueous phase with a pH less than 0. The resulting admixture is admixed with alkaline earth under high shear conditions in an amount effective to generate an exotherm to vaporize the oil and reaction products thereof. A solid reaction product is recovered that is essentially free of oil. If necessary or desired, the substrate can be comminuted prior to the admixture with the mineral acid. Optionally, the substrate can be pretreated with an organic emulsion breaker prior to the admixing with the mineral acid. The substrate preferably comprises drill cuttings, although the method can also be used to remove hydrocarbons from a wide variety of substrates, particularly substrates containing clay. The method is especially attractive for treating drill cuttings contaminated with oil-based drilling mud.

Where the emulsion breaker is used in the method, it is preferably an organic acid or addition salt, such as, for example, alkylsulfonate, arylsulfonate, alkylarylsulfonate, aralkylsulfonate, or a combination thereof, more preferably alkylsulfonic acid, arylsulfonic acid, alkylarylsulfonic acid, aralkylsulfonic acid, or a combination thereof. In a particularly preferred embodiment, the organic acid or addition salt comprises aqueous alkylbenzenesulfonate, for example, alkylbenzenesulfonic acid, and especially dodecylbenzenesulfonate, e.g. dodecylbenzenesulfonic acid (DDBSA). The emulsion breaker is preferably admixed at a rate of from 0.5 to 5 parts by weight per 100 parts of substrate, more preferably at from 1 to 3 parts, and especially at from 1 to 1.5 parts.

The mineral acid is preferably sulfuric acid. The mineral acid is preferably admixed at a rate of from 1 to 20 parts by weight per 100 parts of substrate, more preferably from 2 to 13 parts by weight, and especially from 4 to 7 parts by weight. If desired, a proportion of water can be added with the substrate and mineral acid at a total rate from 20 to 40 parts by weight per 100 parts of the substrate.

The alkaline earth is preferably lime. The lime is preferably admixed in a proportion of from 1 to 16 parts by weight per 100 parts of the substrate, more preferably from 2 to 10 parts, and especially from 3 to 6 parts by weight.

The mineral acid admixing is preferably performed in a first reactor, and admixing the alkaline earth is performed in a second reactor receiving the admixture discharged from the first reactor. The emulsion breaker and the mineral acid admixing can be performed serially in a first reactor. The method preferably includes recovering vapor generated from the first and second reactors, condensing the recovered vapor and exhausting non-condensed gases.

In another embodiment, the present invention provides a method for treating drill cuttings contaminated with oil. The method includes: (a) continuously introducing the drill cuttings into an inlet end of a first reactor comprising at least one rotatable shaft disposed longitudinally in a housing and a plurality of impellors spaced along the shaft; (b) if the drill cuttings have a water content of less than 20 weight percent or an oil content of more than 30 weight percent, continuously introducing an aqueous organic emulsion breaker into the first reactor at a first location adjacent the inlet end; (c) continuously introducing a mineral acid into the first reactor at a second location spaced from an outlet end of the first reactor; (d) rotating the at least one shaft of the first reactor to continuously maintain high shear conditions in the first reactor and discharge an acidified intermediate product; (e) continuously introducing the acidified intermediate product into an inlet end of a second reactor comprising at least one shaft disposed longitudinally in a housing and a plurality of impellors spaced along the shaft; (f) continuously introducing alkaline earth into the second reactor at a location adjacent the inlet end thereof; (g) rotating the at least one shaft of the second reactor to maintain high shear conditions in the second reactor and continuously discharge a reaction product from the outlet end of the second reactor, wherein the reaction product is essentially free of oil.

The proportion of water added to the first reactor with any emulsion breaker and the mineral acid preferably totals from 0 to 40 parts by weight per 100 parts of the drill cuttings. The method can also include recovering vapor generated from the first and second reactors, scrubbing the recovered vapor and exhausting non-condensed gases from the recovered vapor into the atmosphere.

In another embodiment, the present invention provides a method for treating drill cuttings contaminated with oil, comprising: (a) continuously introducing the drill cuttings into an inlet end of a first reactor comprising at least one rotatable shaft disposed longitudinally in a housing and a plurality of impellors spaced along the shaft; (b) continuously introducing from 1 to 3 parts by weight per 100 parts drill cuttings of dodecylbenzenesulfonic acid into the first reactor at a first location adjacent the inlet end; (c) continuously introducing from 2 to 13 parts by weight per 100 parts drill cuttings of sulfuric acid into the first reactor downstream from the first location; (d) rotating the at least one shaft of the first reactor to continuously maintain high shear conditions in the first reactor and discharge an acidified intermediate product; (e) continuously introducing the acidified intermediate product into an inlet end of a second reactor comprising at least one shaft disposed longitudinally in a housing and a plurality of impellors spaced along the shaft; (f) continuously introducing from 2 to 10 parts by weight per 100 parts drill cuttings of lime into the second reactor at a location adjacent the inlet end thereof; (g) rotating the at least one shaft of the second reactor to maintain high shear conditions in the second reactor and continuously discharge a reaction product from the outlet end of the second reactor, wherein the reaction product contains less than 3000 ppm oil; (h) recovering vapor from the first and second reactors; (i) condensing liquid from the recovered vapor to form an exhaust stream of uncondensed vapor.

In a further embodiment, the present invention provides an apparatus for treating a substrate comprising oil-contaminated clay particles for disposal. The apparatus includes first means for admixing the substrate with a concentrated mineral acid under high shear conditions to obtain a pre-heated, acidified admixture having an aqueous phase with a pH less than 0, second means for admixing the admixture from the first means with alkaline earth under high shear conditions in an amount effective to generate an exotherm to vaporize the oil and reaction products thereof, and means for recovering a substantially solid reaction product from said third means essentially free of oil.

In a further embodiment, the present invention provides apparatus for treating drill cuttings contaminated with oil. The apparatus includes means for continuously introducing the drill cuttings into an inlet end of a first reactor comprising at least one rotatable shaft disposed longitudinally in a housing and a plurality of impellers spaced along the shaft, means for continuously introducing an aqueous emulsion breaker into the first reactor at a first location adjacent the inlet end, means for continuously introducing a mineral acid into the first reactor at a second location spaced from an outlet end of the first reactor, means for rotating the at least one shaft of the first reactor to continuously maintain high shear conditions in the first reactor and discharge an acidified intermediate product, means for continuously introducing the acidified intermediate product into an inlet end of a second reactor comprising at least one shaft disposed longitudinally in a housing and a plurality of impellers spaced along the shaft, means for continuously introducing alkaline earth into the second reactor at a location adjacent the inlet end thereof, and means for rotating the at least one shaft of the second reactor to maintain high shear conditions in the second reactor to continuously discharge a reaction product from the outlet end of the second reactor essentially free of oil.

In an alternate embodiment, the present invention provides an apparatus for treating drill cuttings contaminated with oil. The apparatus includes a first reactor comprising a longitudinal housing having an inlet at a first end and an outlet at an opposite end, at least one rotatable shaft disposed longitudinally in the housing, and a plurality of impellers spaced along the at least one shaft, and a second reactor comprising a longitudinal housing having an inlet at a first end and an outlet at an opposite end, at least one rotatable shaft disposed longitudinally in the housing, and a plurality of impellers spaced along the at least one shaft. A first solids feeder is provided for continuously introducing drill cuttings into the inlet of the first reactor. The apparatus includes a tank of emulsion breaker and a line from the emulsion breaker tank for continuously introducing the emulsion breaker into the first reactor adjacent to the inlet. There is a tank of aqueous mineral acid and a line from the mineral acid tank for continuously introducing the mineral acid into the first reactor downstream from the emulsion breaker and upstream from the outlet. A chute is provided for continuously transferring reaction product from the outlet of the first reactor into the inlet of the second reactor. A second feeder is provided for continuously introducing alkaline earth into the second reactor adjacent the inlet end. A third feeder continuously moves reaction product away from the outlet of the second reactor. The apparatus further includes a vapor collection system for recovering gases from the first and second reactors, a condenser for condensing liquid from the gases from the vapor collection system and producing a stream of uncondensed gases, and an exhaust port for discharging uncondensed gases.

The first and second solids feeders preferably include a vapor lock for inhibiting passage of gases from the respective reactors. The emulsion breaker tank can include a charge of dodecylbenzenesulfonic acid. The mineral acid tank can include a charge of sulfuric acid. The apparatus can also include a water line for introducing water with the emulsion breaker and/or mineral acid.

An alkaline earth hopper can be provided for supplying alkaline earth to the second feeder. The alkaline earth hopper can include a charge of lime.

The apparatus preferably includes controllers for metering the rates of the emulsion breaker, mineral acid and lime proportional to a rate of the drill cuttings introduction.

The condenser can include an indirect heat exchanger for cooling the gases, or a direct heat exchanger for contacting the gases with a liquid absorption medium.

Another embodiment of the invention provides a system for drilling a subterranean well with the circulation of oil-based mud without discharging oil-contaminated drill cuttings. The system includes a drilling rig having a drill string for drilling the well and a mud circulation system for circulating oil-based mud and recovering drill cuttings, and a drill cutting treatment unit operatively associated with the drilling rig for receiving the recovered drill cuttings and producing treated drill cuttings of reduced oil content. The treatment unit preferably comprises the apparatus described above.

A further embodiment of the invention provides a method for drilling a subterranean well with the circulation of oil-based mud without discharging oil-contaminated drill cuttings. The method includes operating a drilling rig including a rotary drill string to drill the well, circulating oil-based mud through the drill string to remove drill cuttings from the well, recovering the drill cuttings from the mud, and treating the drill cuttings according to the method described above.

DETAILED DESCRIPTION

Figure 1:
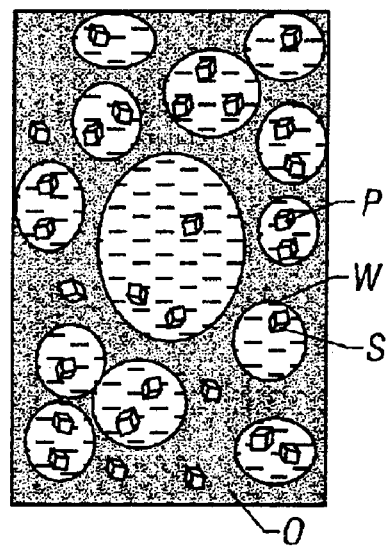
FIG. 1 is a schematic showing the oil, water and solid phases in an oil-based drilling mud.

The process steps applied within this invention are the sequential mixing of the oil-contaminated substrate with mineral acid and alkaline earth. The addition of the mineral acid chemically conditions the substrate for treatment with the alkaline earth and can also initiate exothermic reactions to preheat the substrate and help drive off volatile compounds. The alkaline earth completes a physicochemical transformation of the substrate and further initiates chemical reactions with the substrate, the mineral acid (as reactant and/or catalyst) and the hydrocarbons, that are extremely exothermic, to help vaporize the reaction products and other volatile constituents. The presence of water in the mixture facilitates chemical reaction and aids in vaporization in a manner analogous to steam distillation of hydrocarbons. The hydrocarbons react in the solid/liquid mixture and/or in the vapor phase to form lower molecular weight hydrocarbons, oxygenates and/or mineral acid derivative, e.g. sulfonate. The calcium and mineral acid, e.g. sulfuric acid, can also react to stable solid reaction products, e.g. calcium sulfates, that help stabilize the resultant essentially oil-free solid reaction product.

Drilling mud is a stable emulsion comprised of several chemical products performing many different functions for the drilling of a well, such as temporary casing by the formation of a filter cake, drill bit lubrication and cooling, as well as removal of cuttings from the bottom to the wellbore. The density of the mud can vary anywhere between 900 g/l to 5 kg/l; all of the mud constituents must remain in suspension at all times during operation. During normal subsurface drilling conditions and at the surface, drilling mud and cuttings from the many different geological strata are received to be separated from the mud. Drill cuttings can be clean as they exist in the formation, but at the drill bit and as they travel on their way to the surface, the cuttings become contaminated with the constituents of the mud. In the surface separation of the mud from the drill cuttings, the mud is recovered for further reuse and the drill cuttings must be disposed of.

The separation of the cuttings from the mud is not perfect, so part of the mud remains within the cuttings, intimately mixed, emulsified and with high concentrations of the viscous products, making the cuttings a viscoelastic product. In the same cuttings, the chemical products are bound up as contaminants, forming a sticky matrix, which is difficult to handle and process for decontamination. Drill cuttings thus present a very unique technological problem for their treatment since the protecting cover over the cutting particles impedes the penetration of treatment reagents. These residues are not liquid, but very stable solid-liquid dispersions. The solid phase is colloidal with thixotropic properties. The liquid phase is oil/water.

Although the present invention is described herein with specific reference to drill cuttings as one example, and especially drill cuttings obtained from operations with oil-based drilling muds, other hazardous wastes can also be treated using the present methodology and apparatus, especially clay-containing wastes. Drill cuttings contain large quantities of clay because of the usually high content of this material in the oil deposits and other strata. There are also a wide range of applications for clay at the industrial level, such as in ceramics, paper, drilling fluids, and certain types of lubricating oils. Furthermore, it is used in insecticides, adhesives, unguents, rubber and plastics as well as a catalyst or as a catalyst support.

The present invention utilizes chemical oxidation and/or volatilazation of contaminants to reduce contaminant levels below those required for safe environmental disposal. The apparatus is designed so that the process can be carried out in an automated manner, continuously, reliably and efficiently. There is minimal energy usage per treated weight unit of drill cuttings. Following treatment according to this invention, the treated drill cuttings or other type of hazardous waste are susceptible to be disposed of in any land fill as any other nontoxic, non-hazardous industrial residue.

Contaminated oil-based drill cuttings are in the form of a stable emulsion that must be broken before attempting chemical treatment of the drill cuttings. Breaking the matrix of the oil-based drill cuttings is a physical-chemical process consisting of taking apart and separating each one of the components, invariably producing two liquid phases, an organic (oil) phase and an inorganic (aqueous) phase, as well as a solids phase. The organic phase is formed by modifying the polarity of each of the two phases within an aqueous media through the addition of an acid or other emulsion breaker, which can be enhanced by the addition of heat or agitation, or both.

An emulsion breaker is an acidic or polyvalent compound that is capable of destroying or "breaking" a water-in-oil emulsion. Some emulsions associated with drilling cuttings can be easily broken by a strong acid, particularly where the drill cuttings have a relatively high water content (>20 percent), low oil content (<30 percent), and are generally free of large clumps or balls of solids. Other emulsions that have a low water content or a high oil content, or that exhibit solids clumping, are not as easily broken by the mineral acid alone and require an additional emulsion breaker. The alkylaromatic sulfonic acids, for example, especially dodecylbenzenesulfonic acid (DDBSA), are materials that change the polarity of the solution and certain physical properties such as viscosity and interfacial surface tension, without significantly altering chemical properties besides pH. These compounds can be used in small dosages and they are preferably biodegradable or chemically oxidizable without toxic residue to be used in environmental projects. In the present invention, the emulsion breaker is preferably an amphiphilic molecule or ion, meaning that one portion of the molecule is hydrophobic (water repellent) and another hydrophilic (attracts water). The hydrophobic (tail) portion is usually a hydrocarbon chain, especially one of 12 or more carbon atoms. The hydrophilic (head) portion is ionic or polar (oxyethylene chain, $-NH_2$, $-SO_2OH$, etc.). Within the solution, the emulsion breaker tends to concentrate at the water/oil interface, where the hydrophilic heads can be hydrated with water, and the hydrophobic tails are attracted to the oil molecules.

Figure 2:
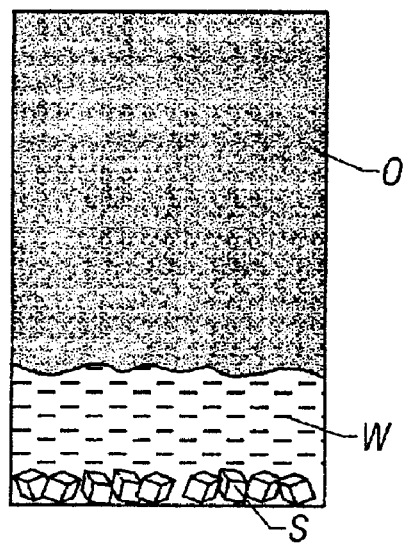
FIG. 2 is a schematic showing the phases of FIG. 1 at the completion of emulsion breaking.

FIGS. 1–2 show a schematic of the breaking of the emulsion from a contaminant residue. FIG. 1 represents drill cutting particles P concentrated in aqueous droplets W in a continuous oil phase O. FIG. 2 shows the system of FIG. 1 following demulsification, having a continuous oil phase O and a generally continuous aqueous phase W containing the particles P. Some of the drill cutting particles P can also occur in the oil phase O prior to demulsification, but are more commonly associated with the aqueous phase W, especially following demulsification.

The demulsification can be done in two different manners, in situ, in a reactor or ex situ, before feeding the drill cuttings to the reactor, such as open space on the drilling site or at a remote location; the principles are the same and they depend more on the demulsifier properties. Because of the specific characteristics of each compound (drill cuttings as well as mud), different treatments are required so that generalization of treatment is impossible. Some of the variables to be controlled in order to break the emulsion are as follows:

1.—Type and quantity of demulsifier; 2.—pH of the mix; 3.—Quantity of transfer vehicle (e.g. water); 4.—Homogenization time; 5.—Residence time; and 6.—Temperature of mixture.

The effectiveness of the technique also depends on the characteristics of the contaminated matrix of the cuttings, such as: 1.—Permeability; 2.—Porosity; 3.—Homogenity of the medium; 4.—Texture; and 5.—Mineralogy. Although the temperature of the mixture is an important factor in breaking the organic phase, there are demulsifiers, such as alkylbenzenesulfonates, preferably in acid form, i.e. alkylbenzenesulfonic acids such as dodecylbenzene sulfonic acid (DDBSA), that work at ambient temperature, facilitating treatment and safeguarding the operation, eliminating the need of heating and thereby lowering costs. Either linear or branched alkylbenzenesulfonic acids can be used to advantage.

The idea with the demulsifier addition is to effect essentially complete breaking of the emulsification without using more demulsifier than is necessary. Excess demulsifier will require additional alkaline earth, as described below, and adversely affects the economics of the process. In most applications, the proportion of emulsion breaker employed will range from 0.5 to 5 parts by weight per 100 parts of substrate (pph), preferably from 1 to 3 pph, and especially from about 1 to about 1.5 pph. The pH of the raw drill cutting will also affect the amount of DDBSA employed. For example, if the pH is relatively low (say 9), the optimum quantity of DDBSA may be 1 pph, but if the pH of the matrix is relatively high (say 13), the optimum might be 1.5 pph.

The emulsion breaker can be added as a neat liquid or solid, but it is more convenient to use a liquid. Depending on its physical state at ambient temperature, the emulsion breaker may need to be liquefied by heating and/or by dilution with water or another solvent. In this manner, water needed in the process can be conveniently added with the emulsion breaker, in amounts described below. For example, the emulsion breaker can be applied to the raw drill cuttings from an aqueous solution typically containing from 5 to 10 weight percent of the DDBSA.

As mentioned, the invention is particularly applicable to hazardous wastes containing clay. When clay makes contact with organic compounds and water, its physical-chemical behavior is altered, often causing unpredictable results. These changes are reflected in the formulation of extremely stable dispersions, which become more stable when in water or soil, where chemical compounds, which form ions in aqueous solution, can be found.

The peptizing of the clay constituent in contaminated oil-based drill cuttings is a physical-chemical process in which the clay is induced to expand by the mineral acid and/or lime, for example, increasing its volume to facilitate the disintegration or dispersion of agglomerated particles. This process can be facilitated by the initial treatment with DDBSA, especially where the drill cutting matrix is very sticky, as in high oil/low water mixtures, and the subsequent treatment with mineral acid and alkaline earth is efficient and economical, without compromising the environment. Peptizing is a physical process that does not break the molecules, and does not flocculate the components of the mixture. In this process, chrome salts, manganese and iron are preferably avoided. With the acidification, apart from destabilizing the agglomerated clay particles, the solid phase is activated to develop its colloidal properties and effect peptization that can occur to an even greater extent upon admixture with the lime.

The idea with the mineral acid addition is to effect essentially complete oil removal without using more acid than is necessary. Sufficient acid must be used to complete emulsion breaking, to pretreat the clay for reaction with the lime, and to obtain the heat of reaction (primarily with the lime) that is necessary for volatilization of the oil. There may be some consumption of the mineral acid by reaction with alkaline earth and metal constituents that occurs in the drill cuttings, especially where a high pH drilling mud is employed. The pH of the aqueous phase of the resulting mixture should preferably be less than 0. On the other hand, excess acid may require additional lime, as described below, adversely affecting the economics of the process. The mineral acid can be diluted with water to achieve the desired result, but is preferably used in concentrated or undiluted strength. The dosage of mineral acid used in this process is preferably from 1 to 20 pph, more preferably from 2 to 13 pph, and especially from 4 to 7 pph. Suitable mineral acids include, for example, sulfuric acid, phosphoric acid, nitric acid, and the like. Combinations of mineral acids can also be used, e.g. a mixture of nitiric and sulfuric acids. Sulfuric acid is particularly preferred.

Due to the temperatures generated by the exothermic nature of the acid addition to the clay-oil substrate, as well as in the subsequent alkaline earth addition, most of the water present in the drill cuttings and added with the emulsion breaker and/or mineral acid will be vaporized. If too much water is added with the emulsion breaker and/or mineral acid, taking into account the water present in the drill cuttings, the reaction temperature may be suppressed to the point that the volatilization can be adversely affected, and the end product will contain an undesirably high level of moisture and/or unreacted hydrocarbons. On the other hand, if too little water is added, the emulsion may not be adequately broken, the mineral acid treatment may not be effective, the alkaline earth reactions may not be adequately promoted and/or the treated product will be too dry and cause dusting. As a practical matter, the quantity of water added with the emulsion breaker, for example, can be adjusted until the desired degree of hydration of the treated drill cuttings is obtained; if the product is too dusty, additional water is added; if it is too wet, less water. The water is preferably added with the emulsion breaker and/or the mineral acid, but can also be added separately. The proportion of water in the drill cuttings following emulsion breaker addition is preferably in the range of from 20 to 40 about pph.

Material conditioning refers to the maximum moisture content at the end of the process, or finished product, preferably no less than 3 weight percent so its handling and final disposition is facilitated. The conditioning of the finished product is also part of the invention since the initial product has relatively higher moisture content and the finished product is an easily handled dry powder, allowing for transporting and final disposal without water as a significant residue. The specific gravity of typical oil based drill cuttings is transformed, for example, from 2.2 at the input to 1.1 1.2 in the treated cuttings. In the present process, the water content of the treated solids can be controlled to avoid dusting while at the same time maintaining a low water content and avoiding the need for any post-treatment processing such as spraying water/surfactant onto the treated solids as is necessary in some prior art processes.

In general, the objective of the alkaline earth addition step following the demulsification and mineral acid addition steps is to detoxify waste or hydrocarbon saturated material by exothermic reactions, including oxidation, that volatilize and vaporize the hydrocarbon constituents. For example, organic compounds can generally be converted into volatile or vaporizable oxygenates such as alcohols, ketones, aldehydes, carboxylic acids, carbon dioxide, and water. Low molecular weight organic compounds are removed in the present invention by a process that is essentially steam distillation from the drill cutting solids, due to the heat generated by the exothermic acid-lime addition reactions. Due to the presence of the sulfuric acid (or other mineral acid), volatile sulfonates are also formed, and the oxygenation reactions can be catalyzed. Additional heating to facilitate vaporization/reaction may be supplied by externally heating the reactor vessels, e.g. by steam jacketing, and/or by preheating the drill cuttings and/or the acid/lime additaments, although it is usually sufficient to conduct the process in an insulated or adiabatic vessel(s) with short residence time to minimize relative heat losses.

Oxidation-reduction reactions occur in pairs, that is, one compound oxidizes at the same time another is reduced. In chemical oxidation for treatment of hazardous wastes, an oxidizing agent is added to oxidize the wastes which, in turn, function as reducing agents. In one embodiment of the present invention, the inorganic acid and especially the organic acid can function as oxidizing agents to oxygenate the hydrocarbons in the drill cutting matrix or in the vapors recovered therefrom. The oxidizing agents are non-specific and can react with any other reducing agent present in the waste material. The chemical oxidation of the organic matter is facilitated by the increase of temperature as a result of the exothermic reaction between the alkaline earth and the acid, as well as the heat of dilution of the acid and lime into the moisture present in the drill cutting matrix. If there are large quantities of organic molecules in the wastes, then correspondingly large amounts of oxidizing agents are required for chemical oxidation. For this reason, initial determination of hydrocarbons is advisable in order to know the initial concentration thereof. The objective is to add the acid and lime in the required amounts so that the process cost is minimized as much as possible, although as a practical matter some excess of the reactants is usually employed to ensure essentially complete removal of the hydrocarbons. For typical oil-based drill cuttings, from 1 to 16 pph, preferably from 2 to 10 pph, and especially from about 3 to about 6 pph of alkaline earth, preferably lime, are used.

Figure 3:
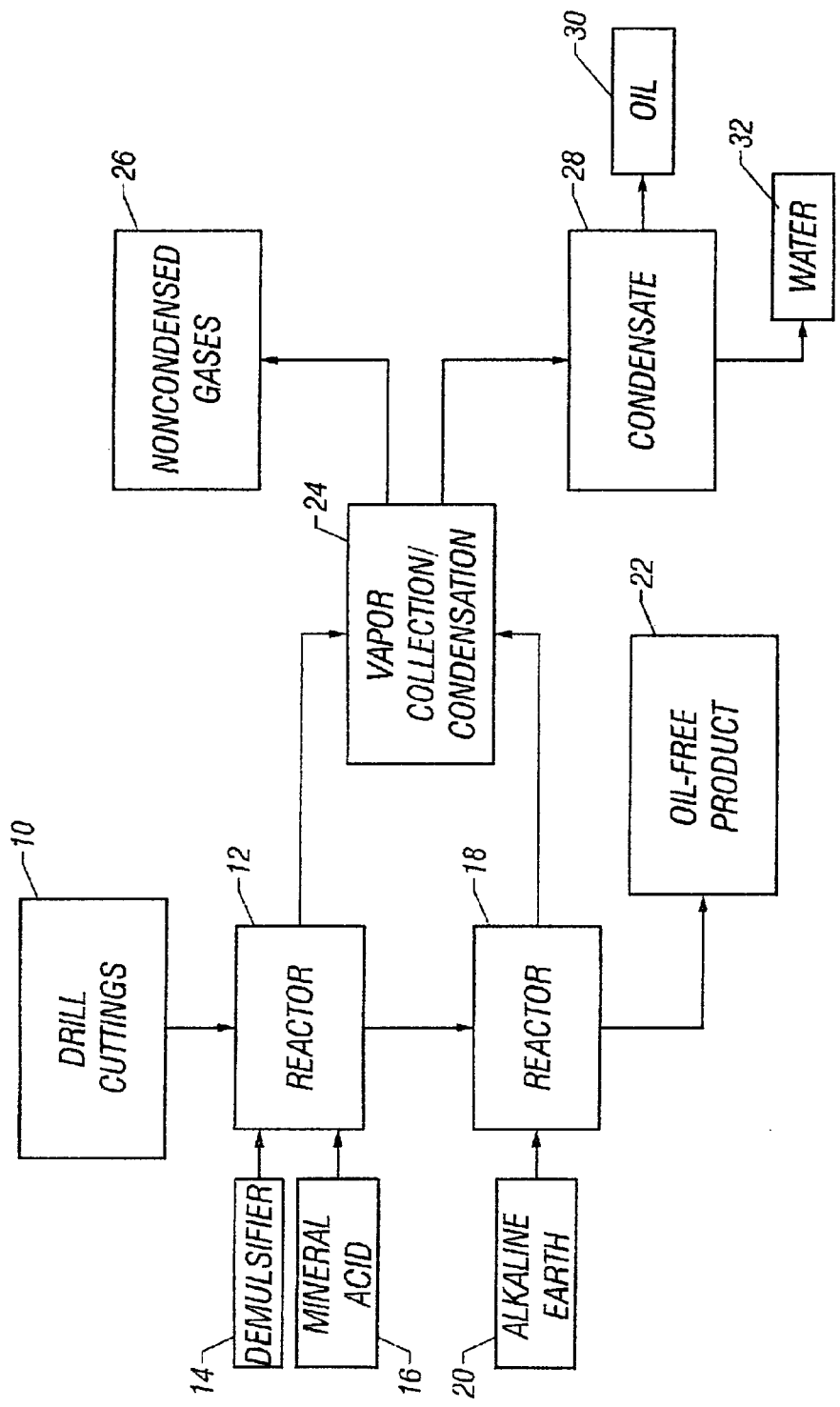
FIG. 3 is a process diagram for the treatment of oil-based drill cuttings according to an embodiment of the invention.

FIG. 3 shows a diagram of the treatment process for oil-based drill cuttings, indicating the different steps of the process, including the addition of the three different reagents, using previously mentioned principles for the three functions. The process begins with the addition of drill cuttings 10 to reactor 12, as well as DDBSA 14 and sulfuric acid 16 in specified quantities and are made to react instantaneously in reactor 12, which can be insulated or heated electrically or by jacketing with steam or other heat transfer fluid. Subsequently, the partially treated drill cuttings from reactor 12 are introduced into reactor 18, which can also be insulated and/or heated, where a specified amount of lime 20 is added, thus completing the process. The treated cuttings 22 are discharged from reactor 16 and can be taken to their final disposal. The chemical reactions that occur are exothermic so that the by-products are primarily oxygenated organic compounds and water gases. These gases pass through a vapor collection system and condenser 24, and the noncondensed gases 26 are vented. If desired, the condensate 28 from vapor collection/condensation 24 can be separated into oil 30 and water 32 and the aqueous phase used to dilute the DDBSA 14 and/or sulfuric acid 16 as needed to provide a control for the moisture content in the treated cuttings 22.

Figure 4:
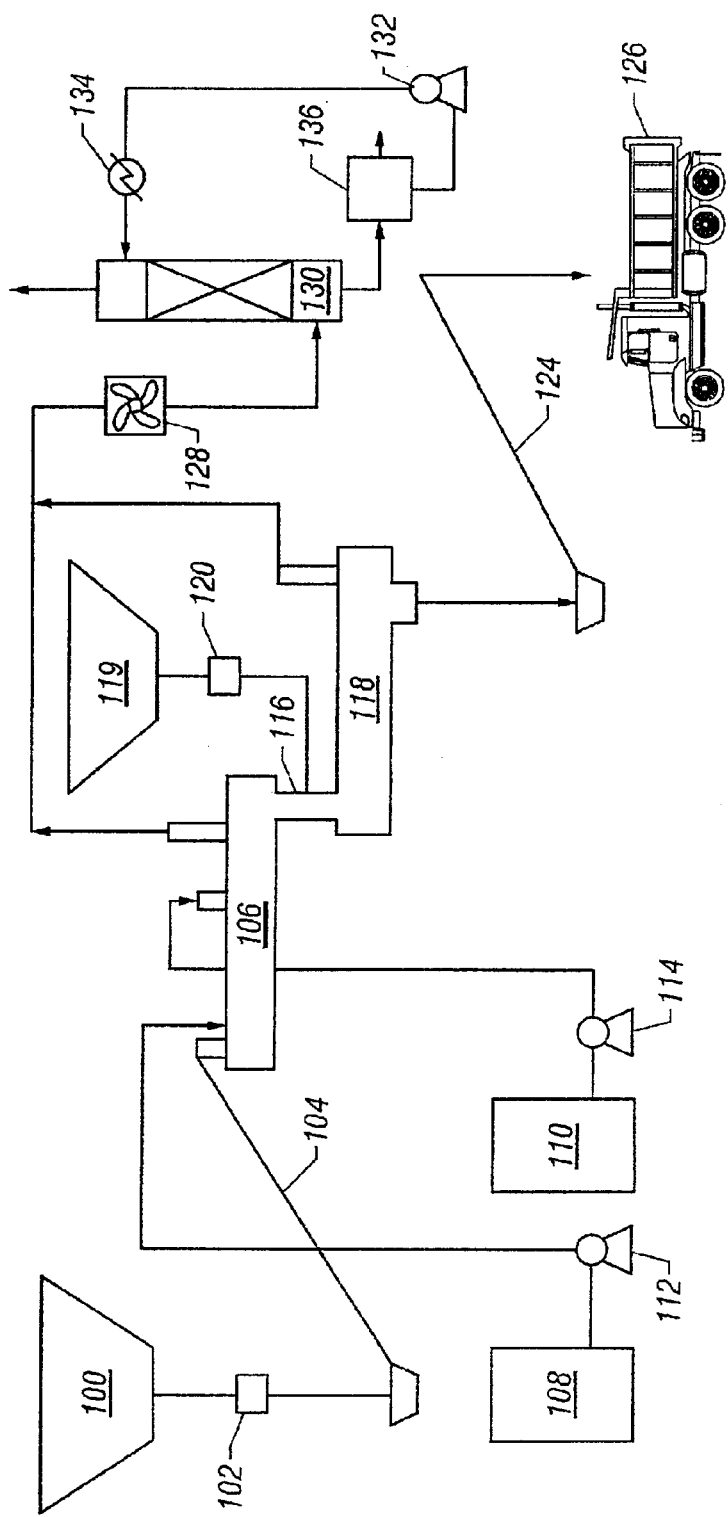
FIG. 4 is a schematic overview of the apparatus according to one embodiment, showing the primary equipment.

FIG. 4 shows the process and the main equipment involved in the invention. The cuttings are fed from the cuttings chute 100 where they flow by gravity to the cuttings dosage feeder 102 to later be discharged by gravity to an inclined drag conveyor 104 in order to reach the required height to be discharged by gravity into the first reactor 106, preferably via a vapor lock (not shown) to inhibit the entry of air into the reactor 106. In reactor 106, the DDBSA is added from storage tank 108 and the sulfuric acid is added from storage tank 110. These reagents are fed through automatic dosage pumps 112 and 114, respectively, in proportion to the quantity of drill cuttings.

Inside reactor 106, the sticky covering of the matrix of the drill cuttings is broken away by the DDBSA, exposing the components of the cuttings to the subsequent acidification, which also occurs continuously in the reactor 106. The design of the reactor 106 helps inhibit sticking of the drill cuttings to the walls and moving parts, although there is no serious detriment to such solids buildup and perhaps some insulating effect. This is achieved through metal alloys as well as high tangential speeds of the moving reactor 106 parts and the drill cuttings. Once the matrix is broken and clays have been acidified, the modified matrix is discharged by gravity via chute 116 into second reactor 118.

Inside the reactor 118, lime is added from feeding hopper 119, dosing it through the feeder 120. Lime can be purchased commercially and reacts synergistically with the acids added in reactor 106 and the organic compounds that are present. The decontaminated cuttings are emptied onto the inclined transport belt 124 and discharged by gravity into the dump trucks 126. Removal of gases from the chemical reactions can be facilitated by induced draft fan 128, and the vapors are forced through the condensation column 130. The non-condensed gases (primarily water vapor and $CO_2$) are dispersed into the atmosphere. The condensation column 130 can be an indirect heat exchanger that cools the gases to form condensate. Alternatively, the condensation column 130 can employ an absorbent such as commercially available caustic or amine solution and direct heat exchange by contacting the gases with the cooled circulating absorbent. A coolant circulation pump 132, heat exchanger 134 and collection/settling drum 136 can be used to facilitate vapor condensation. Accumulated immiscible liquid such as oil and/or solids can be periodically or continuously removed from the drum 136. The heat exchanger 134 can be cooled by air or water or another conventional cooling medium.

Figure 5A:
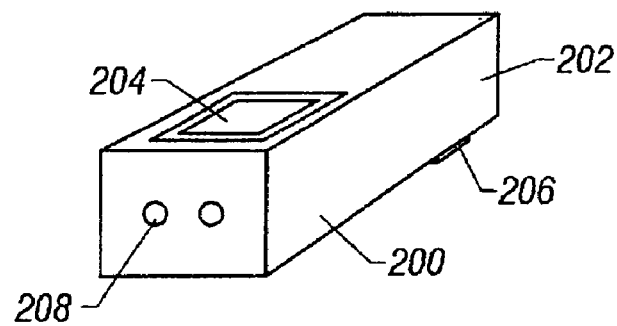
FIG. 5A shows a perspective view of one of the reactor housings according to one embodiment.
Figure 5B:
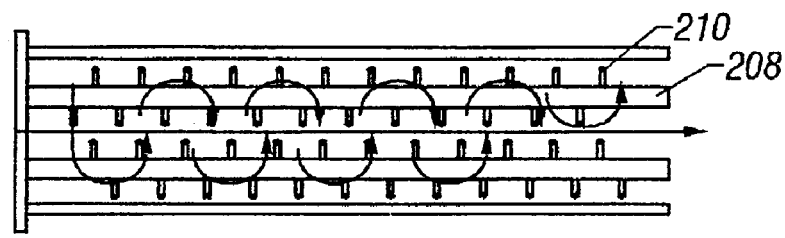
FIG. 5B schematically shows the horizontal flow pattern inside the reactor housing of FIG. 5A.
Figure 5C:
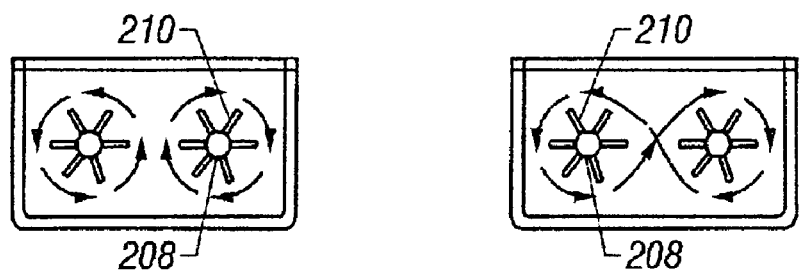
FIG. 5C shows the vertical flow patterns inside the reactor housing of FIG. 5B.

FIG. 5A shows a perspective view of a housing for reactor 200, which can be used for ether of the reactors 106, 118, which can have the same general dimensions and construction. FIGS. 5B and 5C, respectively, show a schematic plan view of the movement of material in reactor 200, and a schematic elevation of the movement of material in the reactor 200. The reactor 200 includes a housing 202, an inlet opening 204 in an upper surface at one end of the reactor 200, and a discharge opening 206 in a lower surface at the other end of the reactor 200. A pair of shafts 208 are longitudinally aligned in the housing 202 and are rotatable in opposite or complementary directions. A plurality of impellers 210 in the form of pins are positioned along the length of the shafts 208. The arrows in FIGS. 5B and 5C show the horizontal and vertical direction of the movement of the materials, as dosed, including the oil-based drill cuttings and the three reagents. If desired, baffles (not shown) may be positioned between adjacent impellers 210. The internal design and construction materials for the reactors has to be such as to resist the extreme pH environments within the process, e.g. stainless steel alloy. Also, the drill cuttings and the reagents preferably follow three different movements simultaneously: a) Circular motion on the vertical plane; b) Linear-transverse motion (U type); and c) Longitudinal linear motion along the reactors, allowing for the input and output volumes and speeds to be the same.

The speed of the materials, as well as the construction materials used to manufacture the reactors 106,118, prevent the viscoelastic matrix from sticking to the walls of reactor 106. The moving speed at the tip of the impellers 210 should ideally be at least 4 meters per second on rotation and 0.2 meters per second on the translation in both directions (U and linear). As one example for a reactor treating 30 metric tons per hour of drill cuttings (15 $m^3/h$), the reactors 106,118 each have twin parallel shafts approximately 12 feet long with 74 paddles/shaft and an 18-in. diameter. The total reaction (residence) time preferably does not exceed 60–80 seconds inside the two reactors (30–40 seconds per each reactor).

The reaction processes require vigorous agitation. The energy for agitation desirably does not exceed 1.5 hp per each metric ton of treated matrix per hour. For example, to treat 30 metric tons per hour of contaminated drill cuttings, the total power required should be 45 hp or less. This process takes place at a pressure slightly higher or preferably slightly lower than atmospheric, thus, a pressure vessel is not required. The materials of construction of the reactor 200 internals are preferably a high nickel stainless steel alloy that is resistant to corrosion at the pH extremes and the temperatures experienced.

Figure 6A:
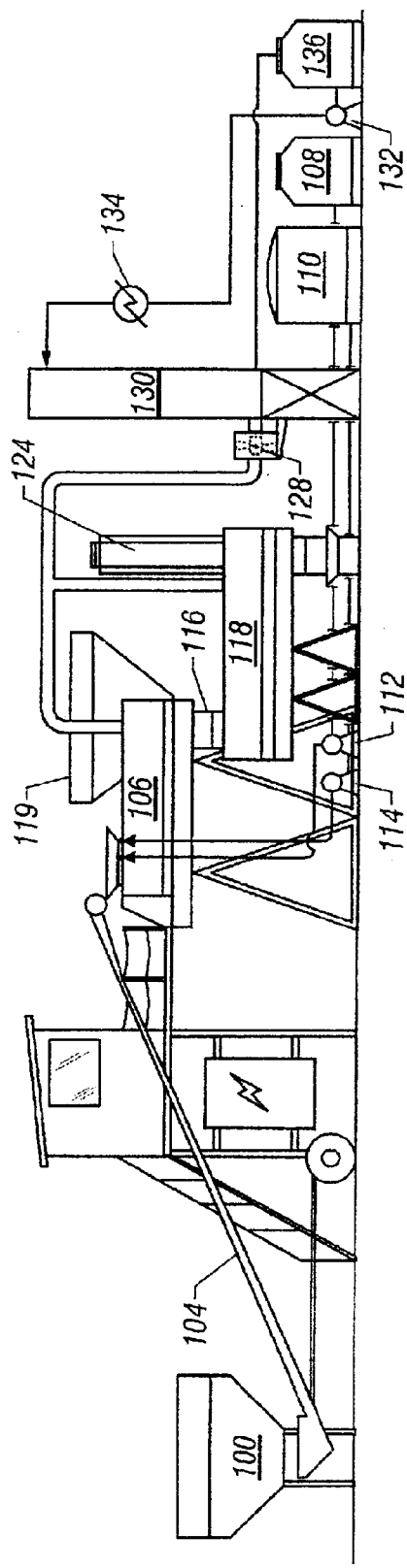
FIG. 6A shows an elevation of the equipment according to one embodiment of the present invention.
Figure 6B:
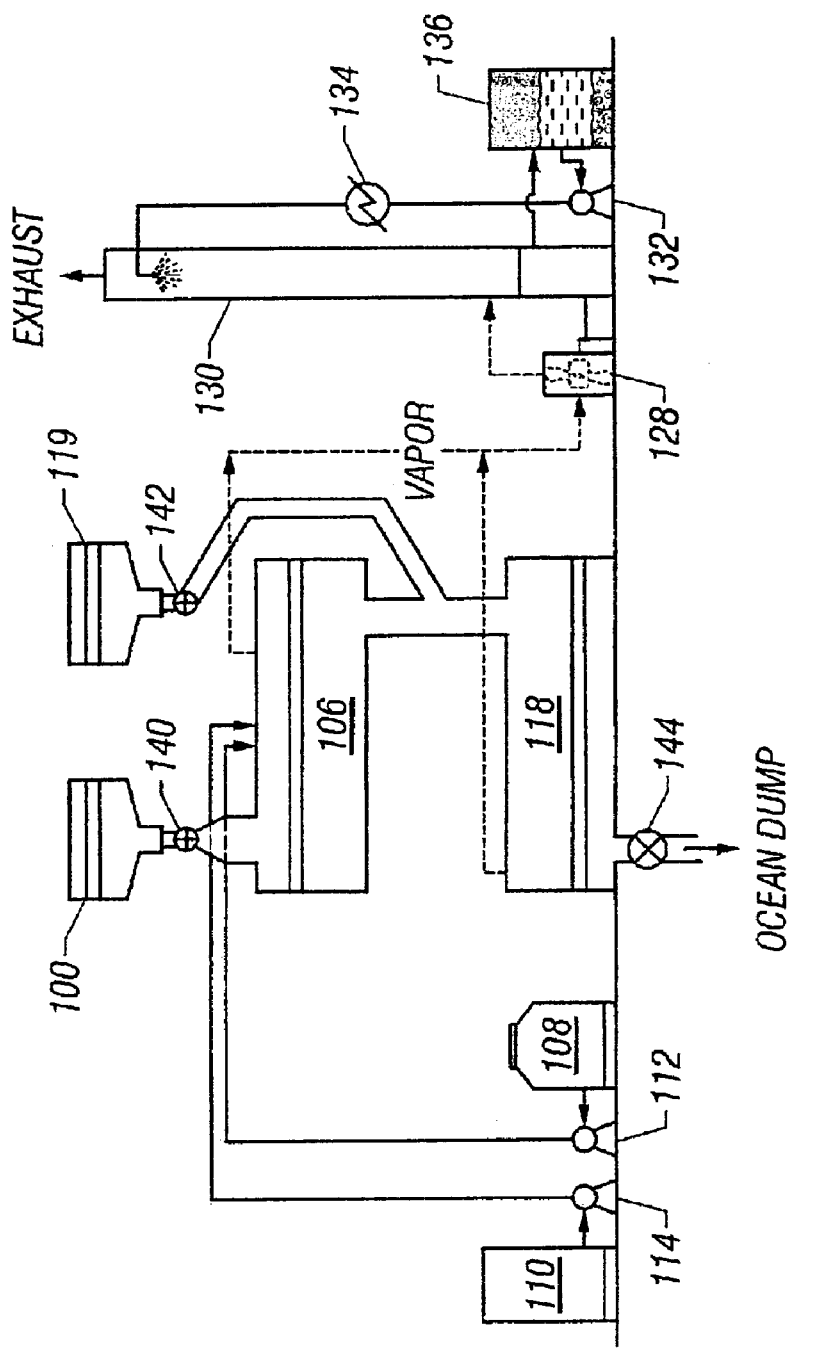
FIG. 6B shows a plan for the equipment according to another embodiment of the present invention.

There are some applications where the footprint available to treat contaminated drill cuttings is very limited, such as on offshore platforms where conditions demand minimal footprints. Under these circumstances, where the reactors could be adapted to a different position; from horizontal they could be placed in the vertical position with the same operational conditions as when installed in the horizontal position. A horizontal lay out typical for land-based treatment of drill cuttings can be observed in FIG. 6A, while a vertical layout more typical for offshore platforms or other applications where the footprint size is critical is seen in FIG. 6B. In FIG. 6B, for example, the second reactor 118 is located directly beneath the first reactor 106.

The solids feeders 142, 144, 146 in FIG. 6B are preferably rotary feeders to inhibit the entry of air into the reactors 106, 118, which might otherwise tend to reduce the reactor temperature. Alternatively, a spring-biased damper (not shown) can be used to inhibit air entry into the system.

The equipment can be installed permanently or in portable units or modules for temporary applications. In addition to the reactors, other peripheral or secondary equipment is needed as per the handling and metering out of materials handled. This equipment includes, hoppers, tanks, feedmeters, pumps and conveyors of different types. The process is continuous so as to achieve maximum equipment efficiency, less energy consumption and lower production costs. The process is automatic so as to insure consistency and unitary process control.

EXAMPLE

A test of the process and apparatus is conducted to treat drill cuttings contaminated with an oil-based drilling mud. The cuttings have a specific gravity of 1.7, a solids content of 59 weight percent, a hydrocarbon content of 14 weight percent, a water content of 37 weight percent, and a pH of 13. The cuttings are supplied at ambient temperature and are continuously processed at a rate of 22 metric tons per hour (361 kg/min) in a series of two reactors, each having twin parallel shafts approximately 4 m long with 74 paddles/shaft and a 0.5 m diameter and a tip speed of at least 4 m/s. The average residence time of the cuttings in each reactor is approximately 40 seconds. Concentrated (98–99 weight percent) sulfuric acid is continuously added near the inlet of the first reactor at 26 kg/min, and the temperature in the first reactor is 110 ° C. near the outlet. Lime is continuously added near the inlet of the second reactor at 25 kg/min, and the outlet temperature of the second reactor is 100 ° C. After establishing steady state operation, treated drill cuttings are obtained from the solids discharge at a rate of 261 kg/min and have a solids content of 87.77 weight percent, a hydrocarbon content of 2300 ppm, a water content of 12 weight percent, and are in the form of a non-dusting powder. Vapor is recovered from the first and second reactors using an induced draft fan at a rate of 157 kg/min, comprising 14.7 weight percent hydrocarbons, 18.8 weight percent oxygenated hydrocarbons, and 66.5 weight percent steam. The vapor is cooled to condense and recover 6.9 kg/min hydrocarbon and 38.9 kg/min water; 111.2 kg/min of vapor are vented.

After describing this invention in detail above, the ordinarily skilled artisan will be able to make many changes and modifications without departing from the spirit of the invention. All these changes and modifications are contemplated as being within the scope and spirit of the appended claims.

What is claimed is:

1. A method for treating an oil-contaminated substrate for disposal, comprising:
   (a) admixing the substrate with a concentrated mineral acid under high shear conditions to obtain an acidified admixture;
   (b) admixing the admixture from (a) with alkaline earth under high shear conditions in an amount effective to generate an exotherm to vaporize the oil and reaction products thereof;
   (c) recovering a solid reaction product from (b) essentially free of oil.

2. The method of claim 1, comprising comminuting the substrate prior to the admixing in (a).

3. The method of claim 1, comprising pretreating the substrate with an organic emulsion breaker prior to the admixing in (a).

4. The method of claim 3, wherein the emulsion breaker comprises an organic acid or addition salt.

5. The method of claim 4 wherein the organic acid or addition salt comprises alkylsulfonate, arylsulfonate, alkylarylsulfonate, aralkylsulfonate, or a combination thereof.

6. The method of claim 5 wherein the emulsion breaker comprises alkyl sulfonic acid, arylsulfonic acid, alkylarylsulfonic acid, aralkylsulfonic acid, or a combination thereof.

7. The method of claim 4 wherein the organic acid or addition salt comprises aqueous alkylbenzenesulfonate.

8. The method of claim 7 wherein the emulsion breaker comprises alkylbenzenesulfonic acid.

9. The method of claim 4 wherein the organic acid or addition salt comprises dodecylbenzenesulfonate.

10. The method of claim 9 wherein the emulsion breaker comprises dodecylbenzenesulfonic acid.

11. The method of claim 4 wherein the emulsion breaker is admixed at a rate of from 0.5 to 5 parts by weight per 100 parts of substrate.

12. The method of claim 3 wherein the emulsion breaker and the mineral acid admixing are performed serially in a first reactor, and the admixing in (b) is performed in a second reactor receiving the admixture discharged from the first reactor.

13. The method of claim 12, further comprising recovering vapor generated from the first and second reactors, condensing the recovered vapor and exhausting non-condensed gases.

14. The method of claim 1, wherein the substrate comprises drill cuttings.

15. The method of claim 14 wherein the drill cuttings are contaminated with oil-based drilling mud.

16. The method of claim 1 wherein the mineral acid comprises sulfuric acid.

17. The method of claim 1 wherein the mineral acid is admixed in (a) at a rate of from 1 to 20 parts by weight per 100 parts of substrate.

18. The method of claim 1 wherein a proportion of water added with the substrate and mineral acid in (a) totals from 20 to 40 parts by weight per 100 parts of the substrate.

19. The method of claim 1 wherein the alkaline earth comprises lime.

20. The method of claim 19 wherein the lime is admixed in (b) in a proportion of from 1 to 16 parts by weight per 100 parts of the substrate.

21. The method of claims 1 wherein the mineral acid admixing is performed in a first reactor, and admixing in (b) is performed in a second reactor receiving the admixture discharged from the first reactor.

22. The method of claim 21, further comprising recovering vapor generated from the first and second reactors, condensing the recovered vapor and exhausting non-condensed gases.

23. The method of claim 1, comprising:
continuously introducing the substrate into an inlet end of a first reactor comprising at least one rotatable shaft disposed longitudinally in a housing and a plurality of impellors spaced along the shaft;
if the substrate has a water content of less than 20 weight percent or an oil content of more than 30 weight percent, continuously introducing an aqueous organic emulsion breaker into the first reactor at a first location adjacent the inlet end;
continuously introducing the mineral acid into the first reactor at a second location spaced from an outlet end of the first reactor;
rotating the at least one shaft of the first reactor to continuously maintain the high shear conditions in the first reactor and discharge an acidified admixture;
continuously introducing the acidified admixture into an inlet end of a second reactor comprising at least one shaft disposed longitudinally in a housing and a plurality of impellors spaced along the shaft;
continuously introducing alkaline earth into the second reactor at a location adjacent the inlet end thereof;
rotating the at least one shaft of the second reactor to maintain the high shear conditions in the second reactor and continuously discharge the reaction product from the outlet end of the second reactor.

24. The method of claim 23, wherein the emulsion breaker comprises an organic acid or addition salt.

25. The method of claim 24 wherein the organic acid or addition salt comprises alkylsulfonate, arylsulfonate, alkylarylsulfonate, aralkylsulfonate, or a combination thereof.

26. The method of claim 25 wherein the emulsion breaker comprises alkylsulfonic acid, arylsulfonic acid, alkylarylsulfonic acid, aralkylsulfonic acid, or a combination thereof.

27. The method of claim 24 wherein the organic acid or addition salt comprises aqueous alkylbenzenesulfonate.

28. The method of claim 27 wherein the emulsion breaker comprises alkylbenzenesulfonic acid.

29. The method of claim 28 wherein the organic acid or addition salt comprises dodecylbenzenesulfonate.

30. The method of claim 29 wherein the emulsion breaker comprises dodecylbenzenesulfonic acid.

31. The method of claim 23 wherein the emulsion breaker is introduced at a rate of from 0.5 to 5 parts by weight per 100 parts of substrate.

32. The method of claim 31, wherein the substrate comprises drill cuttings.

33. The method of claim 31, wherein the substrate comprises drilling mud.

34. The method of claim 23 wherein the emulsion breaker is introduced at a rate of from 1 to 3 parts by weight per 100 pans of substrate.

35. The method of claim 34, wherein the substrate comprises drill cuttings.

36. The method of claim 34, wherein the substrate drill comprises drilling mud.

37. The method of claim 23 wherein the emulsion breaker is admixed at a rate of from 1 to 1.5 pans by weight per 100 parts of substrate.

38. The method of claim 37, wherein the substrate comprises drill cuttings.

39. The method of claim 37, wherein the substrate comprises drilling mud.

40. The method of claim 23 wherein the mineral acid comprises sulfuric, nitric or phosphoric acid, or a combination thereof.

41. The method of claim 40 wherein the mineral acid is introduced at a rate of from 1 to 20 parts by weight per 100 parts of substrate.

42. The method of claim 41, wherein the substrate comprises drill cuttings.

43. The method of claim 41, wherein the substrate comprises drilling mud.

44. The method of claim 40 wherein the mineral acid is introduced at a rate of from 2 to 13 parts by weight per 100 parts of substrate.

45. The method of claim 44, wherein the substrate comprises drill cuttings.

46. The method of claim 44, wherein the substrate comprises drilling mud.

47. The method of claim 23 wherein the proportion of water added to the first reactor with any emulsion breaker and mineral acid totals from 0 to 40 parts by weight per 100 parts of substrate.

48. The method of claim 47, wherein the substrate comprises drill cuttings.

49. The method of claim 47, wherein the substrate comprises drilling mud.

50. The method of claim 23 wherein the alkaline earth comprises lime.

51. The method of claim 50 wherein the lime is introduced in a proportion of from 1 to 16 parts by weight per 100 parts of substrate.

52. The method of claim 51, wherein the substrate comprises drill cuttings.

53. The method of claim 51, wherein the substrate comprises drilling mud.

54. The method of claim 50 wherein the lime is introduced in a proportion of from 2 to 10 parts by weight per 100 parts of substrate.

55. The method of claim 54, wherein the substrate comprises drill cuttings.

56. The method of claim 54, wherein the substrate comprises drilling mud.

57. The method of claim 23, further comprising recovering vapor generated from the first and second reactors, scrubbing the recovered vapor and exhausting non-condensed gases from the recovered vapor into the atmosphere.

58. A method for drilling a subterranean well with the circulation of oil-based mud without discharging oil-contaminated drill cuttings, comprising:
   operating a drilling rig including a rotary drill string to drill the well;
   circulating oil-based mud through the drill string to remove drill cuttings from the well;
   recovering the drill cuttings from the mud;
   treating the drill cuttings according to the method of claim 23.

59. The method of claim 23, wherein the substrate comprises clay.

60. The method of claim 1, wherein the admixture from (a) has an aqueous phase with a pH less than 0.

61. The method of claim 1, wherein the admixture from (a) is preheated.

62. The method of claim 1, wherein the substrate comprises oil-based drilling mud.

63. The method of claim 1, wherein the substrate comprises drilling mud.

64. The method of claim 1, wherein the substrate comprises clay.

65. A method for treating drill cuttings contaminated with oil, comprising:
   continuously introducing the drill cuttings into an inlet end of a first reactor comprising at least one rotatable shaft disposed longitudinally in a housing and a plurality of impellors spaced along the shaft;
   continuously introducing from 1 to 3 parts by weight per 100 parts drill cuttings of dodecylbenzenesulfonic acid into the first reactor at a first location adjacent the inlet end;
   continuously introducing from 2 to 13 parts by weight per 100 parts drill cuttings of sulfuric acid into the first reactor downstream from the first location;
   rotating the at least one shaft of the first reactor to continuously maintain high shear conditions in the first reactor and discharge an acidified intermediate product;
   continuously introducing the acidified intermediate product into an inlet end of a second reactor comprising at least one shaft disposed longitudinally in a housing and a plurality of impellors spaced along the shaft;
   continuously introducing from 2 to 10 parts by weight per 100 parts drill cuttings of lime into the second reactor at a location adjacent the inlet end thereof;
   rotating the at least one shaft of the second reactor to maintain high shear conditions in the second reactor and continuously discharge a reaction product from the outlet end of the second reactor, wherein the reaction product contains less than 3000 ppm oil;
   recovering vapor from the first and second reactors;
   condensing liquid from the recovered vapor to form an exhaust stream of uncondensed vapor.

66. The method of claim 65 wherein from 1 to 1.5 parts of dodecylbenzenesulfonic acid, from 4 to 7 parts of sulfuric acid and from 3 to 6 parts of lime are introduced per 100 parts drill cuttings.

67. The method of claim 66 wherein from 1 to 20 parts by weight of water per 100 parts drill cuttings are introduced with the dodecylbenzenesulfonic acid, the sulfuric acid or a combination thereof.

* * * * *

UNITED STATES PATENT AND TRADEMARK OFFICE
CERTIFICATE OF CORRECTION

PATENT NO. : 6,668,947 B2
DATED : December 30, 2003
INVENTOR(S) : Ramon Perez Cordova It is certified that error appears in the above-identified patent and that said Letters Patent is hereby corrected as shown below:

Title page,
Item [30], delete "[30] Foreign Application Priority Data
Sep. 25, 2001 (MX) …………..01009672"

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,668,947 B2  Page 1 of 1
DATED : December 30, 2003
INVENTOR(S) : Perez-Cordova, Ramon It is certified that error appears in the above-identified patent and that said Letters Patent is hereby corrected as shown below:

<u>Title page,</u>
Item [12], should read -- Perez-Cordova -- not "Cordova".
Item [76], Inventor, should read -- Perez-Cordova -- not "Cordova".
Item [74], *Attorney, Agent, or Firm,* should read -- Lundeen -- not "Lundcon".

Signed and Sealed this

Twentieth Day of December, 2005

JON W. DUDAS
*Director of the United States Patent and Trademark Office*